United States Patent
Leviant et al.

(10) Patent No.: US 9,210,270 B2
(45) Date of Patent: Dec. 8, 2015

(54) ECHO CANCELLATION FOR ULTRASOUND

(71) Applicant: QUALCOMM INCORPORATED, San Diego, CA (US)

(72) Inventors: Michael Leviant, Binyamina (IL); Noam Dagan, Binyamina (IL); Hui-ya Liao Nelson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 13/841,359

(22) Filed: Mar. 15, 2013

(65) Prior Publication Data

US 2014/0135077 A1    May 15, 2014

Related U.S. Application Data

(60) Provisional application No. 61/727,011, filed on Nov. 15, 2012.

(51) Int. Cl.
| | |
|---|---|
| *H04W 24/00* | (2009.01) |
| *H04B 1/38* | (2015.01) |
| *H04B 1/10* | (2006.01) |
| *H04M 9/08* | (2006.01) |
| *G01S 5/22* | (2006.01) |

(52) U.S. Cl.
CPC . *H04M 9/082* (2013.01); *G01S 5/22* (2013.01)

(58) Field of Classification Search
CPC ................................. H04M 9/082; G01S 5/22
USPC ......... 455/456.1, 570, 404.2, 456.5, 222, 223
See application file for complete search history.

(56) References Cited

U.S. PATENT DOCUMENTS

| | | |
|---|---|---|
| 7,515,704 B2 | 4/2009 | Telukuntla |
| 7,720,232 B2 | 5/2010 | Oxford |
| 2008/0198779 A1* | 8/2008 | Jaermyr et al. ............... 370/290 |
| 2008/0317241 A1 | 12/2008 | Wang et al. |
| 2010/0150376 A1 | 6/2010 | Itou |
| 2010/0215185 A1 | 8/2010 | Christoph |
| 2011/0311066 A1 | 12/2011 | Nagy |

(Continued)

FOREIGN PATENT DOCUMENTS

| | | |
|---|---|---|
| CA | 2107198 A1 | 3/1995 |
| EP | 2045620 A1 | 4/2009 |

OTHER PUBLICATIONS

Partial International Search Report for International Application No. PCT/US2013/065948, Mailed on Jan. 23, 2014, 5 pages.

(Continued)

*Primary Examiner* — Dung Hong
(74) *Attorney, Agent, or Firm* — Toler Law Group, PC

(57) ABSTRACT

A method includes accessing signal data descriptive of a transmission sequence and pre-determined values associated with the transmission sequence. The signal data and the pre-determined values may be stored in a memory. The method includes transmitting a signal from a speaker of an electronic device according to the transmission sequence. The method includes generating a frame based on one or more signals received at a microphone of the electronic device. The one or more signals include an echo signal associated with the transmitted signal. The method includes processing the frame using the pre-determined values to produce an output frame in which a contribution associated with the echo signal is reduced.

36 Claims, 8 Drawing Sheets

(56) References Cited

U.S. PATENT DOCUMENTS

2012/0093336 A1* 4/2012 Said et al. .................. 381/92
2012/0213380 A1   8/2012 Mahe et al.
2013/0082875 A1* 4/2013 Sorensen ................... 342/368
2013/0142356 A1* 6/2013 Isaac et al. ................ 381/92

OTHER PUBLICATIONS

International Search Report and Written Opinion for International Application No. PCT/US2013/065948, ISAEPO, Date of Mailing Apr. 4, 2014, 14 pages.

* cited by examiner

ECHO CANCELLATION FOR ULTRASOUND

I. CLAIM OF PRIORITY

The present application claims priority from U.S. Provisional Patent Application No. 61/727,011, filed Nov. 15, 2012 and entitled "ECHO CANCELLATION ALGORITHM FOR ULTRASOUND", the content of which is expressly incorporated herein by reference in its entirety.

II. FIELD

The present disclosure is generally related to echo cancellation at an electronic device.

III. DESCRIPTION OF RELATED ART

Electronic devices may include one or more microphones for receiving signals (e.g., audio signals and/or ultrasound signals) and speaker(s) configured to transmit a signal (e.g., an audio signal and/or an ultrasound signal). A first electronic device may transmit a signal using its speaker(s) and the transmitted signal may be received at one or more microphones of other electronic devices. When a speaker of the first electronic device and a microphone of the first electronic device are in close proximity, echo signals may interfere with signals received at the first electronic device from the other electronic devices. The echo signals may occur when the first electronic device receives its own transmitted signal at one or more of its microphones.

For example, the first electronic device may be a wireless communication device (e.g., a cellular communication device). When an operator of the first electronic device speaks, a signal that represents the speech may be detected by a microphone of the first electronic device and transmitted to a second electronic device (e.g., a second cellular communication device) via a communication network (e.g., via a cellular network). The second electronic device may receive and process the signal (e.g., far end signal) from the first electronic device. Processing the signal (e.g., the speech of the operator of the first electronic device) may include outputting the far end signal at a speaker of the second electronic device. The far end signal output by the speaker of the second electronic device may be detected at a microphone of the second electronic device. In addition to detecting the far end signal, the microphone of the second electronic device may detect a near end signal (e.g., speech of an operator of the second electronic device).

An echo signal may occur when the second electronic device transmits the far end signal (or a signal correlated to the far end signal) to the first electronic device. Stated another way, when the second electronic device transmits a signal that represents the speech of the operator of the first electronic device back to the first electronic device, the operator of the first device will hear himself talking (i.e., the operator will hear an echo). To mitigate the interference caused by the echo signal, the second electronic device may include an adaptive filter, such as an adaptive feedback filter. The adaptive filter is configured to reduce echo by filtering the far end signal from the received signal detected at the microphone of the second electronic device prior to transmitting the near end signal to the first electronic device.

IV. SUMMARY

An electronic device includes a filter, one or more microphones, and a transmitter configured to transmit a signal (e.g., an ultrasound signal) according to a pre-determined transmission sequence. The pre-determined transmission sequence is distinct from an indeterminate far end signal, such as voice from a remote party to a teleconference. The electronic device includes a memory storing pre-determined values associated with the pre-determined transmission sequence. The pre-determined values characterize a signal transmitted according to the pre-determined sequence. The one or more microphones of the electronic device may receive other signals (e.g., other ultrasound signals) transmitted by other electronic devices. Additionally, the signal transmitted by the transmitter of the electronic device may be received at the one or more microphones of the electronic device as an echo signal. A frame may be generated that includes samples of the signals (e.g., the other signals from other electronic devices and the echo signal) received at the one or more microphones of the electronic device, and the frame may be provided to a filter. The filter may be configured to perform echo cancellation operations on each of the samples included in the frame based on the pre-determined values associated with the pre-determined transmission sequence to generate a new frame. In the new frame, a contribution of the echo signal to the received signal may be reduced.

In a particular embodiment, a method includes accessing signal data descriptive of a transmission sequence and pre-determined values associated with the transmission sequence. The method includes transmitting a signal from a speaker of an electronic device according to the transmission sequence. The method includes generating a frame based on one or more signals received at a microphone of the electronic device. The one or more signals may include an echo signal associated with the transmitted signal. The method includes processing the frame using the pre-determined values to produce an output frame in which a contribution associated with the echo signal is reduced (as compared to the frame).

In another embodiment, an apparatus includes a transmitter configured to transmit a signal according to a transmission sequence, a receiver configured to receive one or more signals, a memory storing pre-determined values associated with the transmission sequence, a first processing path, and first logic. The first processing path may be configured to receive an input that is generated based on the one or more received signals, to retrieve the pre-determined values from the memory, and to process the input based on the pre-determined values to produce an output indicative of echo in the received signal. A second processing path may be configured to receive the input and the output from the first processing path, and to generate a second output (e.g., an echo cancelled or echo reduced output) based on a difference between the input and the output.

In another embodiment, a computer-readable storage medium includes instructions executable by a processor to cause the processor to access signal data descriptive of a transmission sequence and pre-determined values associated with the transmission sequence. The instructions, when executed by the processor, cause the processor to instruct a speaker of an electronic device to transmit a signal according to the transmission sequence. The instructions, when executed by the processor, cause the processor to generate a frame based on one or more signals received at a microphone of the electronic device. The one or more signals include an echo signal associated with the transmitted signal. The instructions, when executed by the processor, cause the processor to process the frame using the pre-determined values to produce an output frame in which a contribution associated with the echo signal is reduced.

In another embodiment, an apparatus includes means for transmitting a signal according to a transmission sequence and means for receiving one or more signals. The apparatus includes means for storing pre-determined values associated with the transmission sequence. The apparatus also includes means for generating an input based on the one or more received signals and means for processing the input based on the pre-determined values to produce a first output. The first output is indicative of a contribution of the transmitted signal to the input. The apparatus includes means for generating a second output based on a difference between the input and the first output.

A particular advantage provided by at least one of the disclosed embodiments is a filter configured to perform echo cancellation that has a reduced computational complexity and improved performance as compared to other echo cancellation filters, such as an adaptive feedback filter. For example, improved performance may be realized because the filters of the embodiment described herein do not include a feedback loop, as found in adaptive filters. Another advantage provided by at least one of the disclosed embodiments is reduced power consumption due to the reduced computational complexity of the filter. Other aspects, advantages, and features of the present disclosure will become apparent after review of the entire application.

V. BRIEF DESCRIPTION OF THE DRAWINGS

VI. DETAILED DESCRIPTION

Figure 1:
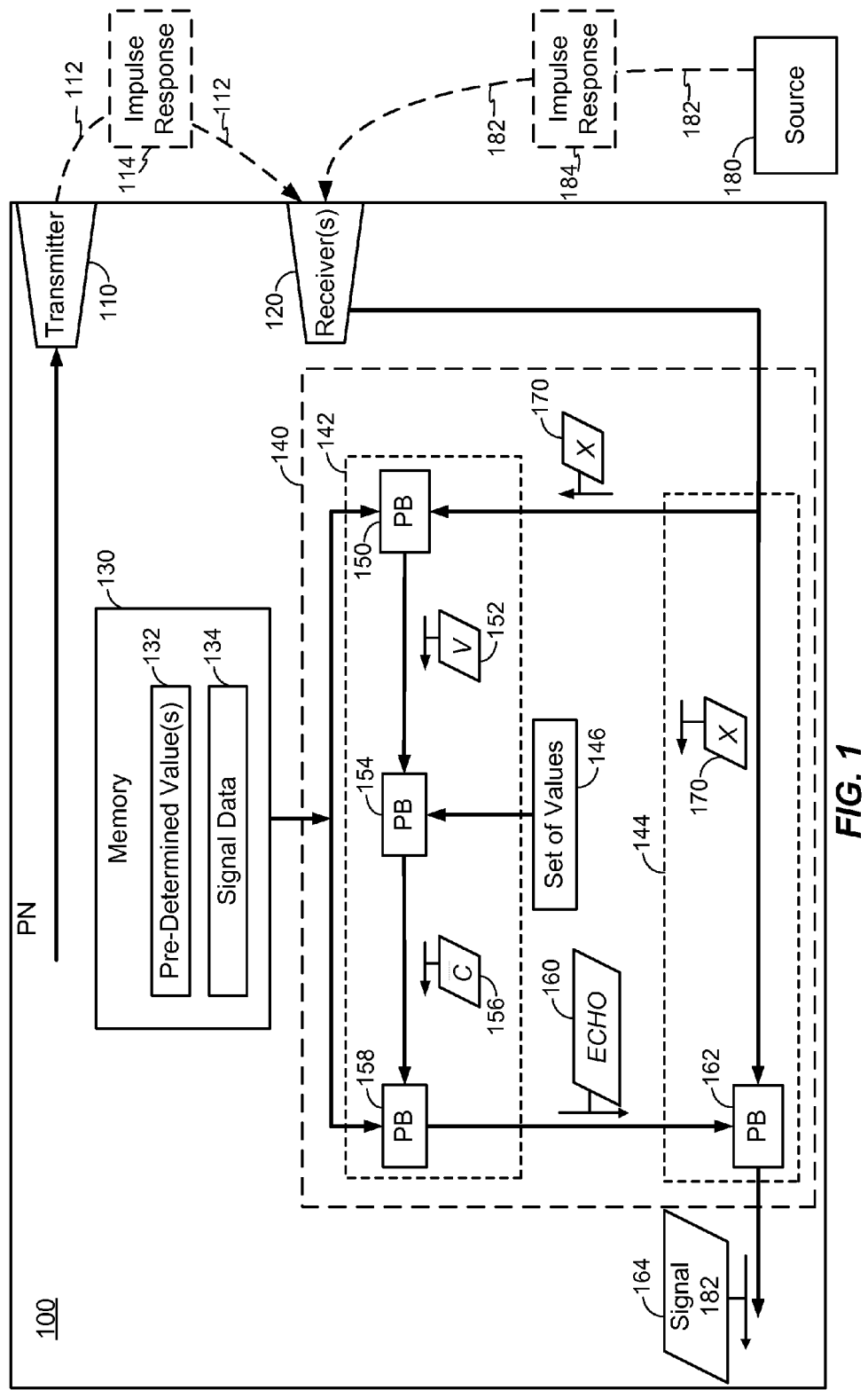
FIG. 1 is a first illustrative embodiment of a system including a device including a filter configured to perform echo cancellation using a pre-determined values associated with a pre-determined transmission sequence of the device.

Particular embodiments of the present disclosure are described further with reference to the drawings (which are not to scale, although relative positions of certain features illustrated in the drawings may be indicated). In the description, common features are designated by common reference numbers throughout the drawings. The embodiments disclosed herein may describe a device including a filter configured to perform echo cancellation based on pre-determined values. The pre-determined values may be associated with a pre-determined transmission sequence used by the device to transmit a signal. The filters of the various embodiments disclosed herein may be described as non-adaptive filters in that the filters remove or reduce echo associated with a pre-determined signal, as opposed to an adaptive feedback filter that reduces echo associated with an indeterminate signal, (e.g. a far end signal).

Referring to FIG. 1, an illustrative embodiment of a system including a device 100 including a filter configured to perform echo cancellation using a pre-determined values associated with a pre-determined transmission sequence is shown. In an embodiment, the device 100 may be a mobile communication device (e.g., a cell phone), a smart phone, a tablet computing device, a laptop computing device, a portable digital assistant (PDA) device, or other electronic device. The device 100 includes a transmitter 110 (e.g., a speaker or transducer), one or more receiver(s) 120 (e.g., one or more microphones), a memory 130, and a filter 140.

The transmitter 110 may be configured to transmit a signal 112 according to a pre-determined transmission sequence. In an embodiment, the transmitter 110 may be an ultrasound transmitter configured to transmit an ultrasound signal according to the pre-determined transmission sequence. As shown in FIG. 1, the memory 130 may store signal data 134. The signal data 134 may include information descriptive of the pre-determined transmission sequence. The pre-determined transmission sequence may be a pseudorandom noise (PN) sequence that may be locally unique to the device 100. In an embodiment, the signal data 134 may include information descriptive of a plurality of transmission sequences (e.g., a plurality of gold codes, a plurality of kasami codes, a plurality of barker codes, etc.), and the device 100 may select the pre-determined transmission sequence from among of the plurality of transmission sequences such that the signal 112 transmitted from the transmitter 110 is locally unique to the device 100. In addition to the signal data 134, the memory 130 may store pre-determined values 132 associated with the pre-determined transmission sequence. The filter 140 may be configured to perform echo cancellation operations on input signals received at the receiver(s) 120 using the pre-determined values 132. The pre-determined values 132 may include values of the signal data 134 after particular mathematical operations have been performed on them. For example, since the signal data 134 are pre-determined, computational demanding calculations related to the signal data 134 be performed in advance (e.g., before the predetermined signal is transmitted) and stored as the pre-determined values 132 to reduce computational burden during operation of the device 100.

During operation, one or more signals (e.g., one or more ultrasound signals) may be received as an input signal at the receiver(s) 120. The one or more signals may include a signal 182 received from a source 180 (e.g., a transmitter of another device not shown in FIG. 1) and an echo signal 112). As described with reference to FIG. 3, the device 100 may be configured to determine a position of the source 180 (or another operation) based on the signal 182. An input signal may be filtered to remove the echo signal 112 to facilitate accurate determination of the position of the source 180. To mitigate the noise caused by the echo signal 112, the device 100 processes the input signal at the filter 140 based on the pre-determined values 132 to reduce or eliminate the signal 112 from the input signal.

As shown in FIG. 1, the filter 140 may include a first processing path 142 and a second processing path 144. The first processing path 142 includes a plurality of processing blocks, such as a first processing block 150, a second processing block 154, and a third processing block 158. The second processing path 144 includes a fourth processing block 162. The terms processing path and processing block are used to describe each of the elements 142, 144, and 150, 154, 158, 162 for simplicity of description. The terms processing path and processing block are not intended to require particular physical circuitry; rather, processing paths and processing blocks are used to describe particular portions of the filter 140 that are operable to implement particular functions, such as the functions described with reference to each of the processing paths 142, 144 and the processing blocks 150, 154, 158, 162. As such, the terms processing path and processing block may, in a particular embodiment, refer to one or more circuits or portions of a circuit that perform a particular function associated with the filter 140. In another embodiment, the terms processing path and processing block may refer to instructions stored in a computer-readable storage medium that, when executed by a processor, cause the processor to initiate execution of a particular function associated with the filter 140.

The input signal may be sampled by the one or more receiver(s) 120. A sample of the input signal may be provided to the filter 140 as a frame 170 (e.g., a digitized representation of the echo signal 112 and the signal 182 combined). The filter 140 may perform echo cancellation on the frame 170 using the pre-determined values 132 to reduce or eliminate the echo signal 112. The frame 170, $\overline{X}$, (i.e., a sample of the input signal received at the receiver(s) 120) may be represented mathematically as $\overline{X}=\overline{H}^0 \oplus \overline{PN}^0 + \overline{H}^1 \oplus \overline{PN}^1$, and where $\overline{H}^0$ corresponds to an impulse response 114 affecting the signal 112, $\overline{PN}^0$ corresponds to the pre-determined transmission sequence of the signal 112, $\overline{H}^1$ corresponds to an impulse response 184 affecting the signal 182, $\overline{PN}^1$ corresponds to a pre-determined transmission sequence of the signal 182, where $\overline{PN}^0$ is different than $\overline{PN}^1$, and where the symbol $\oplus$ indicates convolution.

In the frame $\overline{X}$, $\overline{H}^0 \oplus \overline{PN}^0$ corresponds to the signal 112 (e.g., the echo signal to be cancelled by the filter 140) and $\overline{H}^1 \oplus \overline{PN}^1$ corresponds to the signal 182 received from the source 180. The impulse response 114 may indicate how acoustics of an area surrounding the device 100 (e.g., a room where device 100 is located) affect the signal 112, and the impulse response 184 may indicate how acoustics of an area surrounding the source 180 (e.g., a room where source 180 is located) affect the signal 182. The impulse response 114 may be different from the impulse response 184 even when the device 100 and the source 180 are located in the same area.

The filter 140 may receive the frame 170 from the receiver(s) 120 and provide the frame 170 to the first processing path 142 and the second processing path 144. The first processing path 142 may provide the frame 170 to the first processing block 150. The first processing block 150 may be configured to perform convolution of the frame 170 with the pre-determined values 132 to produce a second frame 152. The second frame 152, $\overline{V}$ may be mathematically represented as $\overline{V}=\overline{X} \oplus \overline{PN}^0 = \overline{H}^0 \oplus \overline{PN}^0 \oplus \overline{PN}^0 + (\overline{H}^1 \oplus \overline{PN}^1) \oplus \overline{PN}^0$. The frame $\overline{V}$ may indicate a correlation between the pre-determined values 132 (e.g., an approximation of the pre-determined transmission sequence of the signal 112) and the input signal (e.g., the frame $\overline{X}$). The transmission sequence, $\overline{PN}^0$, of the device 100 and the transmission sequence, $\overline{PN}^1$, of the source 180 are selected to be substantially orthogonal. Thus, the second frame 152, $\overline{V}$, may approximate $\overline{H}^0 \oplus \overline{PN}^0 \oplus \overline{PN}^0$ based on the correlation between the first frame 170, $\overline{X}$, and the pre-determined values 132.

The second frame 152 (e.g., the frame $\overline{V}$) may be provided from the first processing block 150 to the second processing block 154 where the frame $\overline{V}$ is de-convoluted by $\overline{PN}^0 \oplus \overline{PN}^0$ to produce a third frame 156. The second processing block 154 may perform de-convolution of the frame $\overline{V}$ to remove $\overline{PN}^0 \oplus \overline{PN}^0$ using a set of values 146. The set of values 146 may include a concatenated matrix W, where $$W = \begin{vmatrix} P \\ I \end{vmatrix},$$

and where P=toeplitz($[p_1, p_2, \ldots, p_n]^T$, $[p_1, p_n, p_{n-1}, \ldots, p_{n-k+1}]$), where $p_1, p_2, \ldots, p_n$ correspond to a subset of the frame $\overline{V}$ (i.e., a subset of the plurality of transmission sequences stored as the signal data 180), and where I is diagonal identity matrix multiplied by noise to signal ratio. Thus, the frame $\overline{C}$ may correspond to an estimate of the impulse response 114, that is $\overline{C}$ is an estimate of $\overline{H}^0$.

The third frame 156 (e.g., the frame $\overline{C}$) may be provided to the third processing block 158. The third processing block 158 may convolute the third frame 156 (e.g., the frame $\overline{C}$) with the pre-determined values 132 (e.g., an approximation of $\overline{PN}^0$) to generate a fourth frame 160, $\overline{ECHO}$, which may be mathematically represented as $\overline{ECHO}=\overline{C} \oplus \overline{PN}^0 \approx \overline{H}^0 \oplus \overline{PN}^0$. The frame $\overline{ECHO}$ may represent an estimate of a portion of the frame $\overline{X}$ corresponding to the echo signal 112) to be cancelled by the filter 140.

The fourth processing block 162 may receive the fourth frame 160 from the third processing block 158 and the frame 170 (e.g., the frame $\overline{X}$) as inputs and generate an output frame 164. The fourth processing block 162 may generate the output frame 164 by subtracting the frame $\overline{ECHO}$ (e.g., the estimate of the echo signal 112) from the frame $\overline{X}$. Thus, the output frame 164 may correspond to an estimate of $\overline{H}^1 \oplus \overline{PN}^1$ (i.e., the signal 182 convoluted by the impulse response 184).

By storing the pre-determined values 132 associated with the locally unique transmission sequence (i.e., a PN sequence or $\overline{PN}^0$) of the device 100 and then using the pre-determined values 132 to perform echo cancellation, the device 100 may consume less power due to the reduced computational complexity of the echo cancellation filter 140 as compared to other echo cancellation filters, such as an adaptive feedback filter. For example, to perform echo cancellation operations, an adaptive feedback filter may dynamically adapt to a transmitted signal and a received signal in order to determine both a transmission sequence ($\overline{PN}''$) and an impulse response ($\overline{H}''$) corresponding to an unknown echo signal. In contrast, the filter 140 performs echo cancellation on a received signal (e.g., the frame $\overline{X}$) using the pre-determined values 132 (e.g., a pre-transmission sequence ($\overline{PN}^0$)) stored at the memory 130. The computational complexity of the filter 140 may be reduced because the transmission sequence of the device 100 is pre-determined and stored at the memory 130 as the pre-determined values 132. Thus, to perform echo cancellation, the filter 140 need only estimate the impulse response 114 ($\overline{H}^0$) using convolution as described with reference to the processing blocks 150, 154, 158. Additionally, implementation costs may be reduced due to reduced computational resources used to perform echo cancellation using the filter 140 (i.e., by performing convolution operations on a received signal using the pre-determined values 132) as compared to other filters, such as the adaptive feedback filter where both the transmission sequence and the impulse response are unknown.

Figure 2:
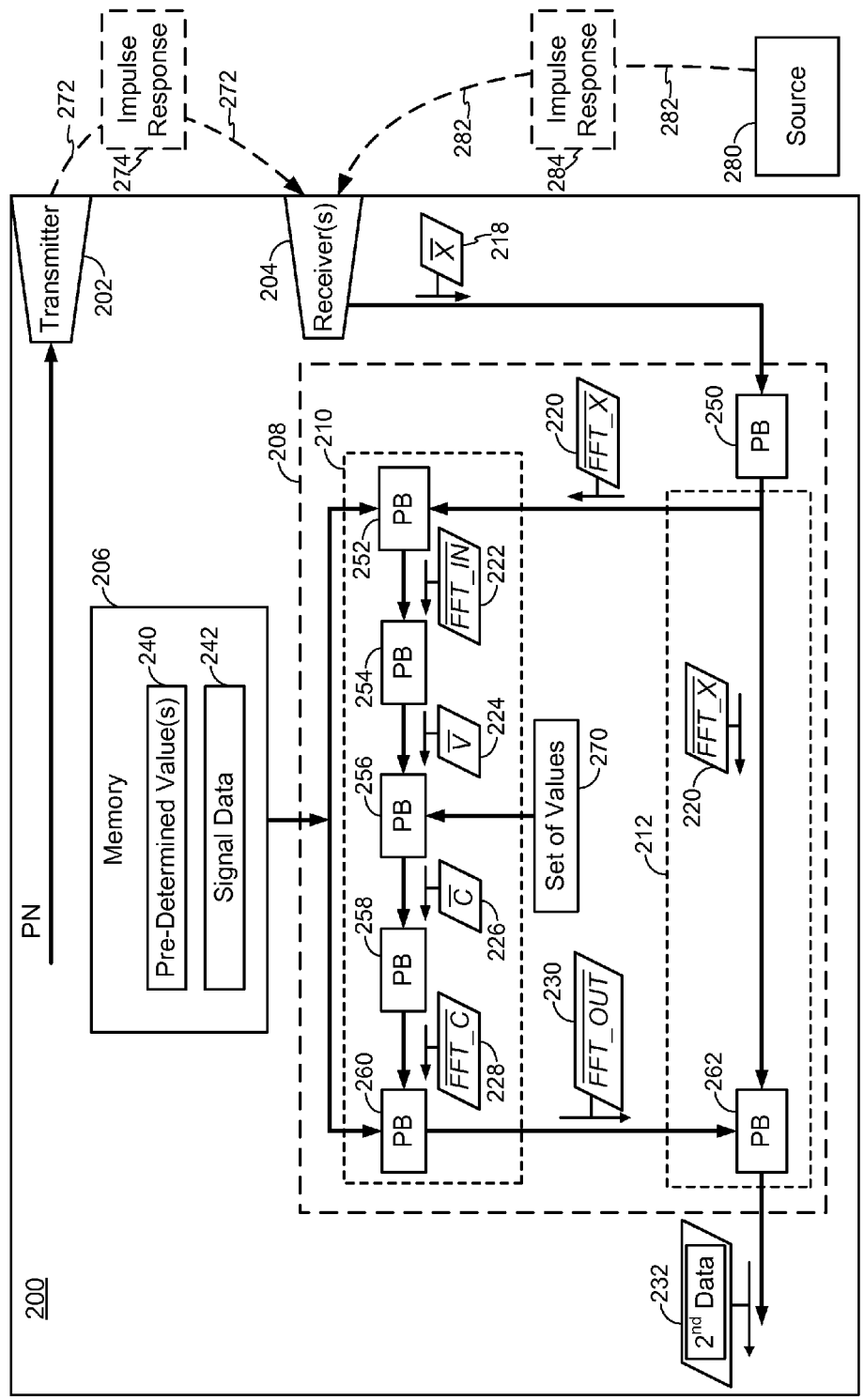
FIG. 2 is a second illustrative embodiment of a system including a device including a filter configured to perform echo cancellation using a pre-determined values associated with a pre-determined transmission sequence of the device.

Referring to FIG. 2, a second illustrative embodiment of a system including a device 200 including a filter configured to perform echo cancellation using pre-determined values is shown. In a particular embodiment, the device 200 may be a mobile communication device (e.g., a cell phone), a smart phone, a tablet computing device, a laptop computing device, a portable digital assistant (PDA) device, or other electronic device. The device 200 includes a transmitter 202, one or more receiver(s) 204, a memory 206, and a filter 208.

The transmitter 202 may be configured to transmit a signal 272 according to a pre-determined transmission sequence. In an embodiment, the transmitter 202 may be an ultrasound transmitter configured to transmit an ultrasound signal according to the pre-determined transmission sequence. As shown in FIG. 2, the memory 206 may store signal data 242. The signal data 242 may include information descriptive of the pre-determined transmission sequence. The pre-determined transmission sequence may be a pseudorandom noise (PN) sequence that may be locally unique to the device 200. In an embodiment, the signal data 242 may include information descriptive of a plurality of transmission sequences (e.g., a plurality of gold codes, a plurality of kasami codes, a plurality of barker codes, etc.), and the device 200 may select the pre-determined transmission sequence from among of the plurality of transmission sequences such that the signal 272 transmitted from the transmitter 202 is locally unique to the device 200. In addition to the signal data 242, the memory 206 may store pre-determined values 240 associated with the pre-determined transmission sequence. In an embodiment, pre-determined values 240 may include pre-calculated values based on the signal data 242, such as a fast Fourier transform (FFT) of the pre-determined transmission sequence that is locally unique to the device 200. One of ordinary skill in the art would easily recognize that any other generally known time-to-frequency domain transform techniques such as, without limitation, discrete Cosine transform, discrete Fourier transform, or Wavelet transform, may be used instead of the FFT. The filter 208 may be configured to perform echo cancellation operations on input signals received at the receiver(s) 204 using the pre-determined values 240. In contrast to the echo cancellation operations performed by the filter 140 of FIG. 1, the echo cancellation operations performed by the filter 208 may include operations in both a frequency domain (e.g., using FFT operations) and a time domain (e.g., using inverse fast Fourier transform (IFFT) operations).

During operation, one or more signals (e.g., one or more ultrasound signals) may be received as an input signal at the receiver(s) 204. The one or more signals may include a signal 282 received from a source 280 (e.g., a transmitter of another device not shown in FIG. 2) and an echo signal 272. The echo signal 272 may introduce noise into the signal 282. As described with reference to FIG. 3, the device 200 may be configured to determine a position of the source 280 (or another operation) based on the signal 282. An input signal received at the one or more receiver(s) 204 may be filtered to remove the echo signal 272 to improve accuracy of the determination of the position of the source 280.

As shown in FIG. 2, the filter 208 may include a first processing block 250, a first processing path 210 and a second processing path 212. The first processing path 210 includes a plurality of processing blocks, such as a second processing block 252, a third processing block 254, a fourth processing block 256, a fifth processing block 258, and a sixth processing block 260. The second processing path 212 includes a seventh processing block 262. The terms processing path and processing block are used to describe each of the elements 210, 212, and 250, 252, 254, 256, 258, 260, 262 for simplicity of description. The terms processing path and processing block are not intended to require particular physical circuitry; rather, processing paths and processing blocks are used to describe particular portions of the filter 208 that are operable to implement particular functions, such as the functions described with reference to each of the processing paths 210, 212 and the processing blocks 250, 252, 254, 256, 258, 260, 262. As such, the terms processing path and processing block may, in a particular embodiment, refer to one or more circuits or portions of a circuit that perform a particular function associated with the filter 208. In another embodiment, the terms processing path and processing block may refer to instructions stored in a computer-readable storage medium that, when executed by a processor, cause the processor to initiate execution of a particular function associated with the filter 208.

An input signal received at the one or more receiver(s) 204 may be sampled by the one or more receiver(s) 204. A sample of the input signal may be provided to the filter 208 as a frame 218. The filter 208 may perform echo cancellation on the frame 218 using the pre-determined values 240 to reduce or eliminate the echo signal 272. The frame 218 may be received at the filter 208 as a frame $\overline{X}$, which may be represented mathematically as $\overline{X}=\overline{H}^0 \oplus \overline{PN}^0 + \overline{H}^1 \oplus \overline{PN}^1$, where $\overline{H}^0$ corresponds to an impulse response 274 affecting the signal 272, $\overline{PN}^0$ corresponds to the pre-determined transmission sequence of the signal 112, $\overline{H}^1$ corresponds to an impulse response 284 affecting the signal 282, $\overline{PN}^1$ corresponds to a pre-determined transmission sequence of the signal 282, where $\overline{PN}^0$ is different than $\overline{PN}^1$, and where the symbol $\oplus$ indicates convolution. The first processing block 250 may perform an FFT operation on the frame $\overline{X}$ to generate a frame 220. The frame 220 represents the frame $\overline{X}$ in the frequency domain (i.e., $\overline{FFT\_X}=FFT(\overline{X})$). The FFT operation herein is just for an exemplary purpose and any other generally known time-to-frequency domain transform techniques such as, without limitation, discrete Cosine transform, discrete Fourier transform, or Wavelet transform, may be performed in the first processing block 250, instead of the FFT.

In the frame $\overline{X}$, $\overline{H}^0 \oplus \overline{PN}^0$ corresponds to the echo signal 272 received at the one or more receivers 204 which is to be cancelled or reduced by the filter 208. Further, $\overline{H}^1 \oplus \overline{PN}^1$ corresponds to the signal 282 received from the source 280. The impulse response 274 may indicate how acoustics of an area surrounding the device 200 (e.g., a room where device 200 is located) affect the signal 272, and the impulse response 284 may indicate how acoustics of an area surrounding the source 280 (e.g., a room where source 280 is located) affect the signal 282. The impulse response 274 may be different from the impulse response 284 even when the device 200 and the source 280 are located in the same area (e.g., the same room).

The first processing block 250 may provide the frame 220 to the first processing path 210 and to the second processing path 212. The first processing path 210 may provide the frame 220 to the second processing block 252. The second processing block 252 may be configured to multiply the frame 220 by $FFT(\overline{PN}^0)$ determined from the pre-determined values 240 to generate a second processed frame 222. Thus, the second processing block 252 multiplies the $FFT(\overline{X})$ by the $FFT(\overline{PN}^0)$, which is mathematically equivalent to convolution of the frame $\overline{X}$ with $\overline{PN}^0$ in the time domain (e.g., as described with reference to the first processing block 150 of FIG. 1). The second frame 222, frame $\overline{FFT\_IN}$, where the frame FFT_IN represents a correlation of the $\overline{PN^o}$ with the frame $\overline{X}$ in the time domain. The second frame 222 may be provided to the third processing block 254.

The third processing block 254 may perform an IFFT operation on the second frame 222 to produce a third frame 224. The IFFT operation herein is just for an exemplary purpose and any other generally known frequency-to-time domain transform techniques such as, without limitation, inverse discrete Cosine transform, inverse discrete Fourier transform, or inverse Wavelet transform, may be performed in the third processing block 254, instead of the IFFT. The third frame 224, frame $\overline{V}$, may indicate a correlation between the $\overline{PN^o}$ and the input signal (e.g., the frame $\overline{X}$) in the time domain. For example, assuming that the signal 112 of FIG. 1 and the signal 272 of FIG. 2 are transmitted according to the same pre-determined transmission sequence (i.e., the pre-determined values 240=FFT(the pre-determined values 132), the frame $\overline{V}$ of FIG. 2 may be the same as the frame $\overline{V}$ of FIG. 1 provided the signal 182 and 282 is same or substantially similar.

The third frame 224 (e.g., the frame $\overline{V}$) may be provided from the third processing block 254 to the fourth processing block 256 where the frame $\overline{V}$ is de-convoluted from $\overline{PN^o} \oplus \overline{PN^o}$ to produce a fourth frame 226. The fourth processing block 256 may perform de-convolution of the frame $\overline{V}$ from $\overline{PN^o} \oplus \overline{PN^o}$ using a set of values 270. The set of values 270 may correspond to the set of values 146 described with reference to FIG. 1. The fourth frame 226 may be a frame $\overline{C}$, where the frame $\overline{C}$ corresponds to an estimate of the impulse response 274 (e.g., an estimation of $\overline{H^o}$).

The fourth frame 226 (e.g., the frame $\overline{C}$) may be provided to the fifth processing block 258. The fifth processing block 258 may perform a FFT operation on the fourth frame 226 (e.g., FFT($\overline{C}$)) to generate a fifth frame 228, $\overline{FFT\_C}$, which corresponds to the estimate of the impulse response 274 in the frequency domain. The FFT operation herein is just for an exemplary purpose and any other generally known time-to-frequency domain transform techniques such as, without limitation, discrete Cosine transform, discrete Fourier transform, or Wavelet transform, may be performed in the fifth processing block 258, instead of the FFT.

The fifth frame 228 (e.g., the frame $\overline{FFT\_C}$) may be provided to the sixth processing block 260. The sixth processing block 260 may be configured to multiply the fifth frame 228 by the pre-determined values 240 (e.g., the FFT($\overline{PN^o}$)) to produce a sixth frame 230, $\overline{FFT\_OUT}$. Multiplying the frame $\overline{FFT\_C}$ (e.g., the FFT($\overline{C}$)) by the pre-determined values 240 (e.g., the FFT($\overline{PN^o}$) in the frequency domain is mathematically equivalent to convolution of the frame $\overline{C}$ by the pre-determined values 240 in the time domain, as described with reference to the first processing block 158 of FIG. 1. The sixth frame 230 (e.g., the frame $\overline{FFT\_OUT}$) may represent, in the frequency domain, a portion of the frame $\overline{X}$ corresponding to the echo signal 272 to be cancelled by the filter 208.

The seventh processing block 262 may receive the sixth frame 230 (e.g., the frame $\overline{FFT\_OUT}$) from the sixth processing block 260 and the frame 220 (e.g., the frame $\overline{FFT\_X}$) as inputs and generate an output frame 232. The seventh processing block 262 may generate the output frame 232 by subtracting the frame $\overline{FFT\_OUT}$ (e.g., the signal 272) from the frame $\overline{FFT\_X}$. Thus, the output frame 232 may represent an estimate of the signal 282 in the frequency domain.

By storing the pre-determined values 240 (e.g., the FFT($\overline{PN^o}$) associated with the locally unique transmission sequence (i.e., a PN sequence) of the device 200 and then using the pre-determined values 240 to perform echo cancellation, the device 200 may consume less power due to the reduced computational complexity of the echo cancellation filter 208 as compared to other echo cancellation filters, such as an adaptive feedback filter. For example, to perform echo cancellation operations, an adaptive feedback filter may dynamically adapt to a transmitted signal and a received signal in order to determine both a transmission sequence ($\overline{PN''}$) and an impulse response ($\overline{H''}$) corresponding to an unknown echo signal. In contrast, the filter 140 performs echo cancellation on a received signal (e.g., the frame $\overline{X}$) using the pre-determined values 240 (e.g., FFT($\overline{PN^o}$)) stored at the memory 206. The computational complexity of the filter 208 may be reduced because calculations based on the transmission sequence of the device 200 can be done in advance with results stored at the memory 206 as the pre-determined values 240. Thus, to perform echo cancellation, the filter 208 only estimates the impulse response ($\overline{H^o}$), as described with reference to the processing block 256. As demonstrated in FIG. 2, the impulse response (e.g., the frame $\overline{FFT\_C}$) may be estimated using a combination of time domain processing (e.g., de-convolution) and frequency domain processing. Additionally, implementation costs may be reduced due to computational resources used to perform echo cancellation using the filter 208 as compared to other filters, such as the adaptive feedback filter.

Figure 3:
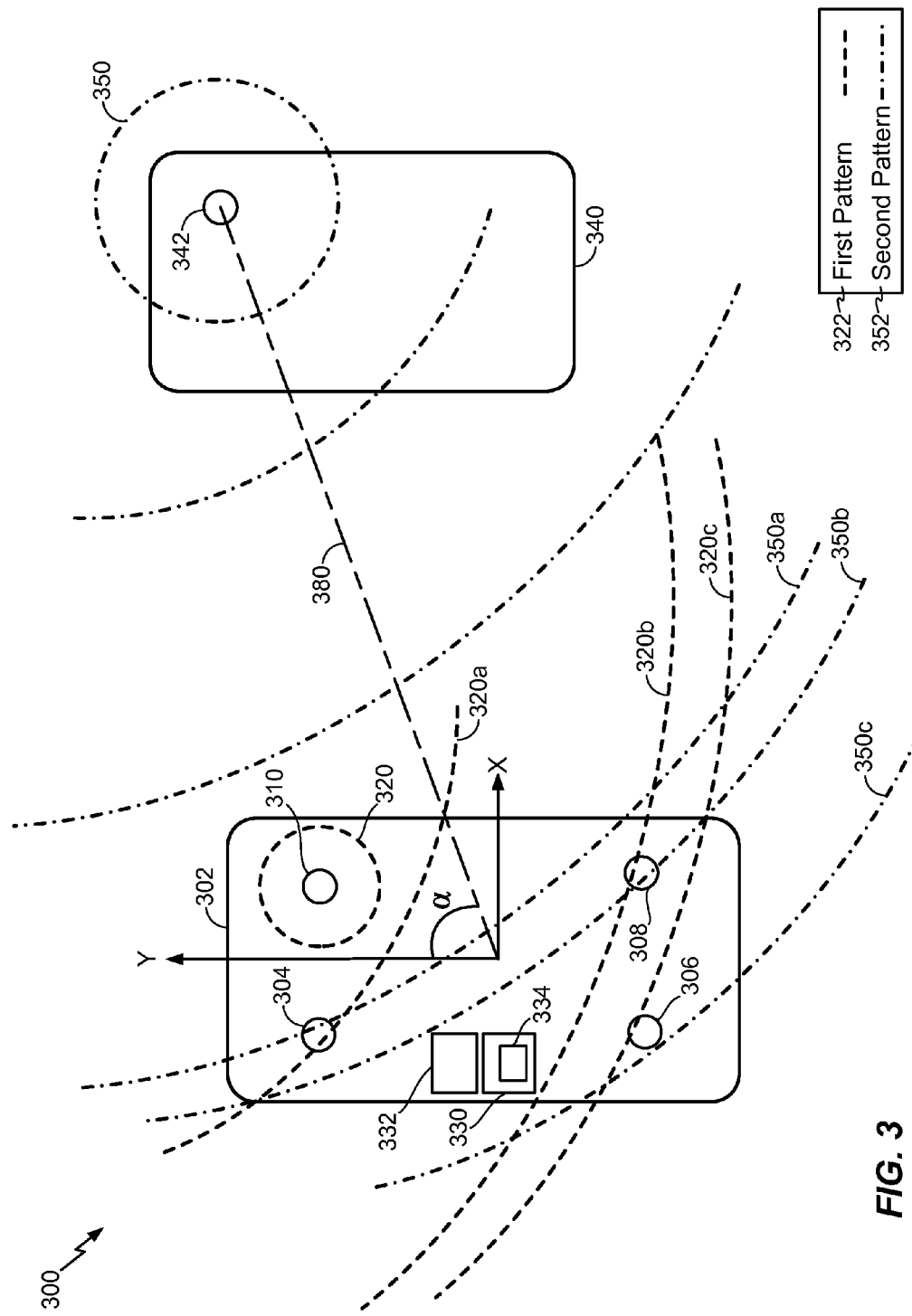
FIG. 3 is an illustrative embodiment of a multi-user peer-to-peer positioning system including a device that includes a filter configured to perform echo cancellation using a pre-determined values associated with a pre-determined transmission sequence of the device.

Referring to FIG. 3, an illustrative embodiment of a multi-user peer-to-peer positioning system 300 is shown. As shown in FIG. 3, the multi-user peer-to-peer positioning system 300 includes a first electronic device 302 and a second electronic device 340. The first electronic device 302 includes microphones 304, 306, 308 and a transmitter 310. In a particular embodiment, the microphones 304, 306, 308 may correspond to the receiver(s) 120 described with reference to FIG. 1 or the receiver(s) 204 described with reference to FIG. 2 and the transmitter 310 may correspond to the transmitter 110 described with reference to FIG. 1 or the transmitter 202 described with reference to FIG. 2. As shown in FIG. 3, the first electronic device 302 may transmit a first signal 320 (e.g., a first ultrasound signal) from the transmitter 310 according to a first transmission sequence, and the second electronic device 340 may transmit a second signal 350 (e.g., a second ultrasound signal) from the transmitter 342 according to a second transmission sequence. As shown in FIG. 3, the first signal 320 is designated by a first pattern 322 and the second signal 350 is designated by a second pattern 352.

The first electronic device 302 may receive the second signal 350 at one or more of the microphones 304, 306, 308 and may determine a location of the second electronic device 340 based on the second signal 350 using triangulation. For example, in FIG. 3, the first electronic device 302 receives the second signal 350 as a signal 350a at the microphone 304, a signal 350b at the microphone 308, and a signal 350c at the microphone 306. The first electronic device 302 may use time delays associated with each of the signals 350a, 350b, 350c to estimate, or triangulate, the position of the second electronic device 340. In an embodiment, estimating the position of the second electronic device 340 may include determining an angle α that indicates a direction of the location of the second electronic device 340 and a distance 380. In a particular embodiment, the distance 380 corresponds to a distance between the first electronic device 302 and the second electronic device 340. It is noted that although only three microphones are shown in FIG. 3, the first electronic device 302 may include more than three microphones.

As shown in FIG. 3, the first signal 320 may be received as an echo signal (e.g., the signals 320a, 320b, 320c) at one or more of the microphones 304, 306, 308. The echo signals may interfere with, or otherwise degrade the accuracy of calculations of the position of the second electronic device 340. As shown in FIG. 3, the first electronic device 302 includes a memory 330 and a filter 332. The memory 330 may store pre-determined values 334 associated with the first transmission sequence used by the transmitter 310 to transmit the first signal. In a particular embodiment, the memory 330 may correspond to the memory 130 of FIG. 1, or the memory 206 of FIG. 2. The filter 332 may receive a frame including samples of the signal(s) received at each of the microphones 304, 306, 308 (e.g., the first signal 320 and the second signal 350) and may perform echo cancellation operations prior to calculating an estimate of the position of the second electronic device 340. In a particular embodiment, the filter 332 may correspond to the filter 140 described with reference to FIG. 1 or the filter 208 described with reference to FIG. 2.

In an embodiment, the device 302 may interact with the device 340 and other devices (not shown) to form a peer-to-peer positioning system. The device 302 may be configured to determine a location of other devices operating within the peer-to-peer positioning system based on the output of the filter 332. Each of the devices operating within the peer-to-peer positioning system may transmit a signal that is received at the device 302 (e.g., at the microphones 304, 306, 308) and used by the device 302 to determine an estimated location of each device that transmitted a signal that was received at the device 302.

To distinguish the signals transmitted from each of the devices, the device 302 may negotiate with each of the other devices to select a particular transmission sequence from a set of pre-determined transmission sequences (e.g., gold codes). In a particular embodiment, the set of transmission sequences comprise a family of transmission sequences where each of the transmission sequences has a low cross-correlation relative to the other transmission sequences in the family. After selecting the particular transmission sequence, the device 302 periodically transmits a signal (e.g., the signal 320) according to the selected particular transmission sequence. In a particular embodiment, each of the transmission sequences may comprise a periodic sequence. The device 302 may periodically transmit the signal 320 based on a time interval. In an embodiment, the time interval may be determined based on a length of the selected particular transmission sequence.

By storing information (e.g., the pre-determined values 334) associated with the locally unique transmission sequence (e.g., PN) of the first electronic device 302 and then using the stored information to perform echo cancellation using the filter 332, the first electronic device 302 may consume less power due to the reduced computational complexity of the filter 332 as compared to other echo cancellation filters, such as an adaptive feedback filter. The reduced computational complexity of the filter 332 may also enable the first electronic device 302 to perform faster location determinations.

Figure 4:
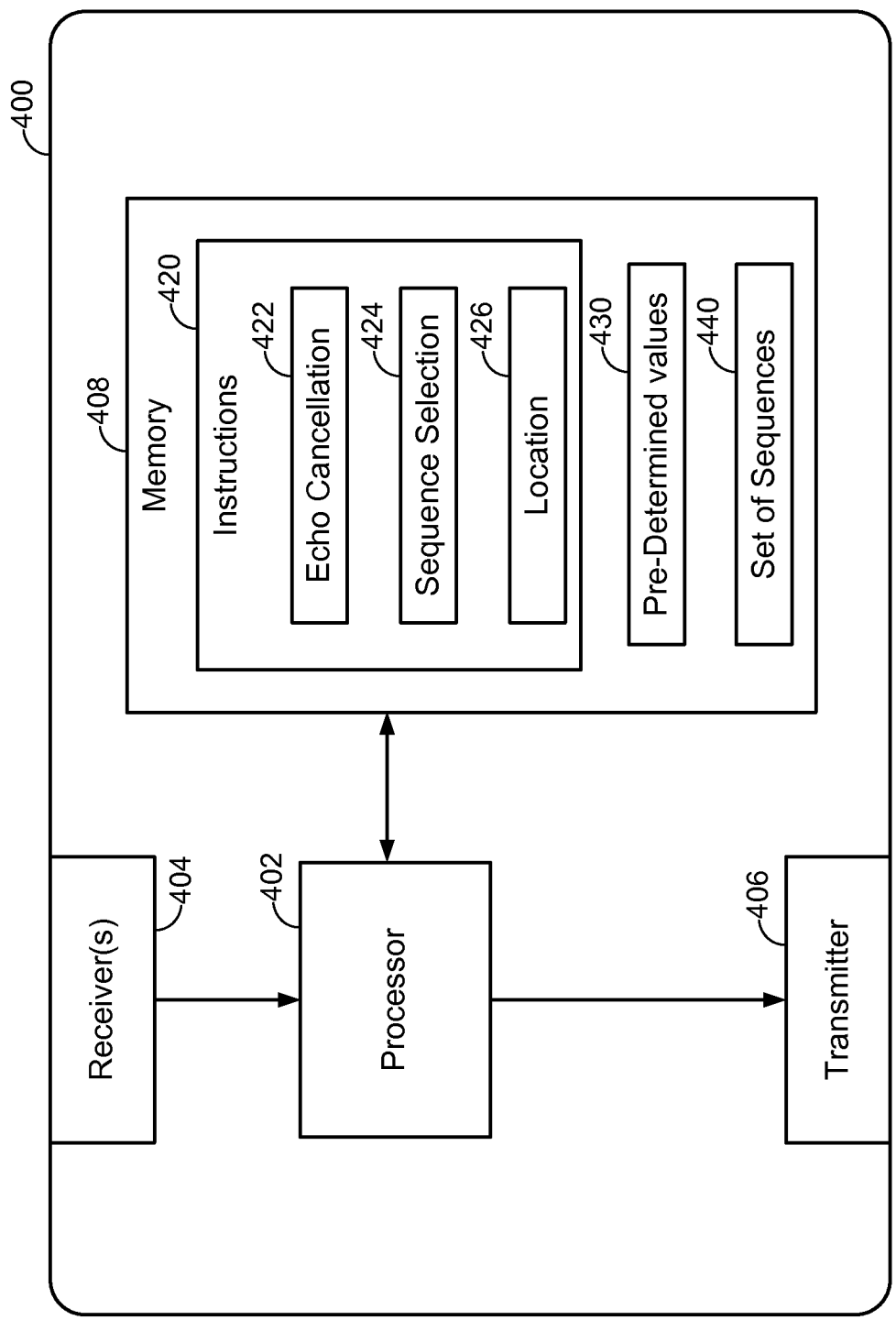
FIG. 4 is another illustrative embodiment of a device including a filter configured to perform echo cancellation using a pre-determined values associated with a pre-determined transmission sequence of the device.

Referring to FIG. 4, another illustrative embodiment of a device 400 configured to perform echo cancellation is shown. As shown in FIG. 4, the device 400 includes a processor 402, a receiver(s) 404, a transmitter 406, and a memory 408. In a particular embodiment, the device 400 may correspond to the device 100 of FIG. 1, the device 200 of FIG. 2, or the device 302 of FIG. 3. The memory 408 may store instructions 420. The instructions 420 may be executable by the processor 402 to perform the one or more of the functions described with reference to the filter 140 of FIG. 1 or the filter 208 of FIG. 2.

In an embodiment, the instructions 420 may include instructions executable to perform location determinations based on signals received at the receiver(s) 404, such as location instructions 426. The location instructions 426 may be executable by the processor 402 to determine, or triangulate, positions of other devices based on signals received from the other devices at the receiver(s) 404 as described with reference to FIG. 3. The location instructions 426 may be executable by the processor 402 to determine an angle (e.g., the angle α described with reference to FIG. 3) that indicates a direction of the location of the other device and a distance (e.g., the distance 380 described with reference to FIG. 3).

In an embodiment, the instructions 420 may include instructions executable to dynamically select a particular transmission sequence from a set of transmission sequences 440 and to store pre-determined values 430 at the memory 408. For example, the instructions 420 may include sequence selection instructions 424. The sequence selection instructions 424 may be executable by the processor 402 to select a particular transmission sequence from the set of transmission sequences 440. In an embodiment, the set of transmission sequences 440 comprise gold code sequences. Each transmission sequence in the set of transmission sequences 440 may have a low cross-correlation relative to other transmission sequences in the in the set of transmission sequences 440. The sequence selection instructions 424 may include instructions that cause the processor 402 to communicate with other devices via a wireless communication link (e.g., a Bluetooth or Wi-Fi communication link), within a communication range of the device 400, to determine a locally unique transmission sequence to be used by the transmitter 406. The transmission sequence may be considered locally unique in that each device within the communication range of the device 400 may use a different transmission sequence while devices outside of the communication range of the device 400 may concurrently be using the same transmission sequence as the device 400.

After selecting the transmission sequence, the sequence selection instructions 424 may cause the processor 402 to calculate or to access the pre-determined values 430. In an embodiment, the pre-determined values 430 are stored at the memory 408 before the transmitter 406 begins transmitting a signal according to the transmission sequence. For example, after selecting the transmission sequence, the sequence selection instructions 424 may cause the processor 402 to calculate the pre-determined values 430 for the selected transmission sequence and to store the pre-determined values 430 at the memory 408. In this particular embodiment, the sequences selection instructions 424 may include instructions executable by the processor 402 to indicate, during operation, the particular selected transmission sequence and a corresponding set of the pre-determined values 430 to use for echo cancellation. To illustrate, the set of transmission sequences may include ten (10) different transmission sequences and the pre-determined values 430 may include values calculated based on each transmission sequence. A particular transmission sequence may be selected for use in transmissions via the transmitter 406. During echo cancellation operations, the processor 402 may use pre-determined values 430 corresponding to the particular transmission sequence used by the transmitter 406. In another embodiment, only a single set of pre-determined values 430 may be generated and stored at the memory 408 using the sequence selection instructions 424.

Figure 5:
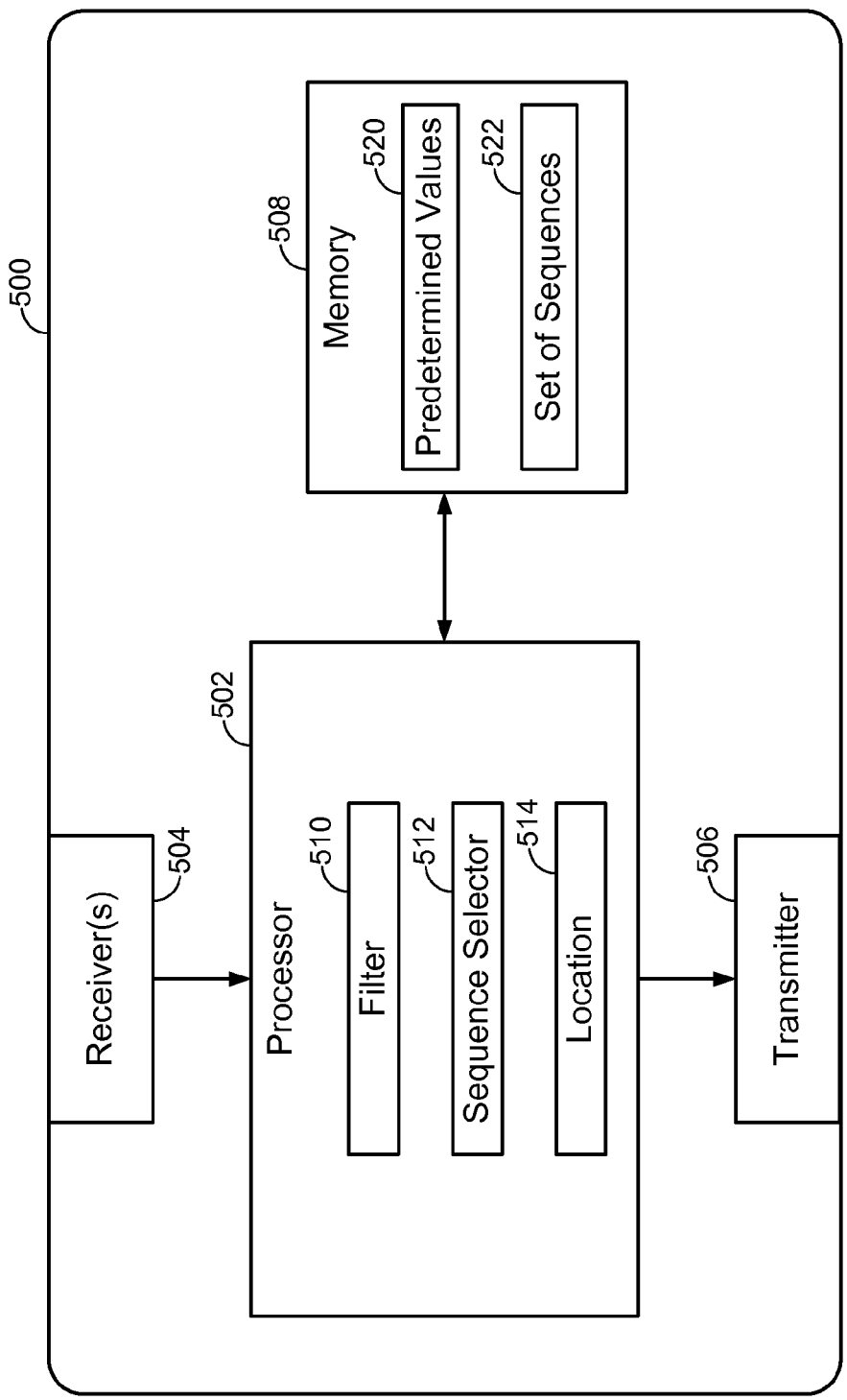
FIG. 5 is another illustrative embodiment of a device including a filter configured to perform echo cancellation based on a pre-determined transmission sequence of the device.

Referring to FIG. 5, another illustrative embodiment of a device 500 configured to perform echo cancellation is shown. As shown in FIG. 5, the device 500 includes a processor 502, a receiver(s) 504, a transmitter 506, and a memory 508. In a particular embodiment, the device 500 may correspond to the device 100 of FIG. 1 or the device 200 of FIG. 2. The memory 508 may store a set of transmission sequences 522 and pre-determined values 520. As shown in FIG. 5, the processor 502 includes a filter 510, a sequence selector 512, and a location determination unit 514. In a particular embodiment, the filter 510 may correspond to the filter 140 of FIG. 1 or the filter 208 of FIG. 2. For example, the filter 510 may include circuitry or other logic configured to perform one or more of the operations described with reference to the filter 140 of FIG. 1 or the filter 208 of FIG. 2. The filter 510 may access the memory 508 to retrieve the pre-determined values 520 for use in echo cancellation operations.

In an embodiment, the sequence selector 512 may include circuitry or other logic configured to perform one or more of the functions described with reference to the sequence selection instructions 424 of FIG. 4. In an embodiment, the location determination unit 514 may include circuitry or other logic configured to perform one or more of the functions described with reference to the location instructions 426 of FIG. 4. As shown in FIG. 5, the filter 510, the sequence selector 512, and the location determination unit 514 may be part of the processor 502. In another embodiment, one or more of the filter 510, the sequence selector 512, and the location determination unit 514 may be external to the processor 502. For example, one or more of the filter 510, the sequence selector 512, and the location determination unit 514 may be implemented by a field-programmable gate array (FPGA) device, an application-specific integrated circuit (ASIC), a special purpose processing unit, a digital signal processor (DSP), a controller, another hardware device, a firmware device, or a combination thereof.

Figure 6:
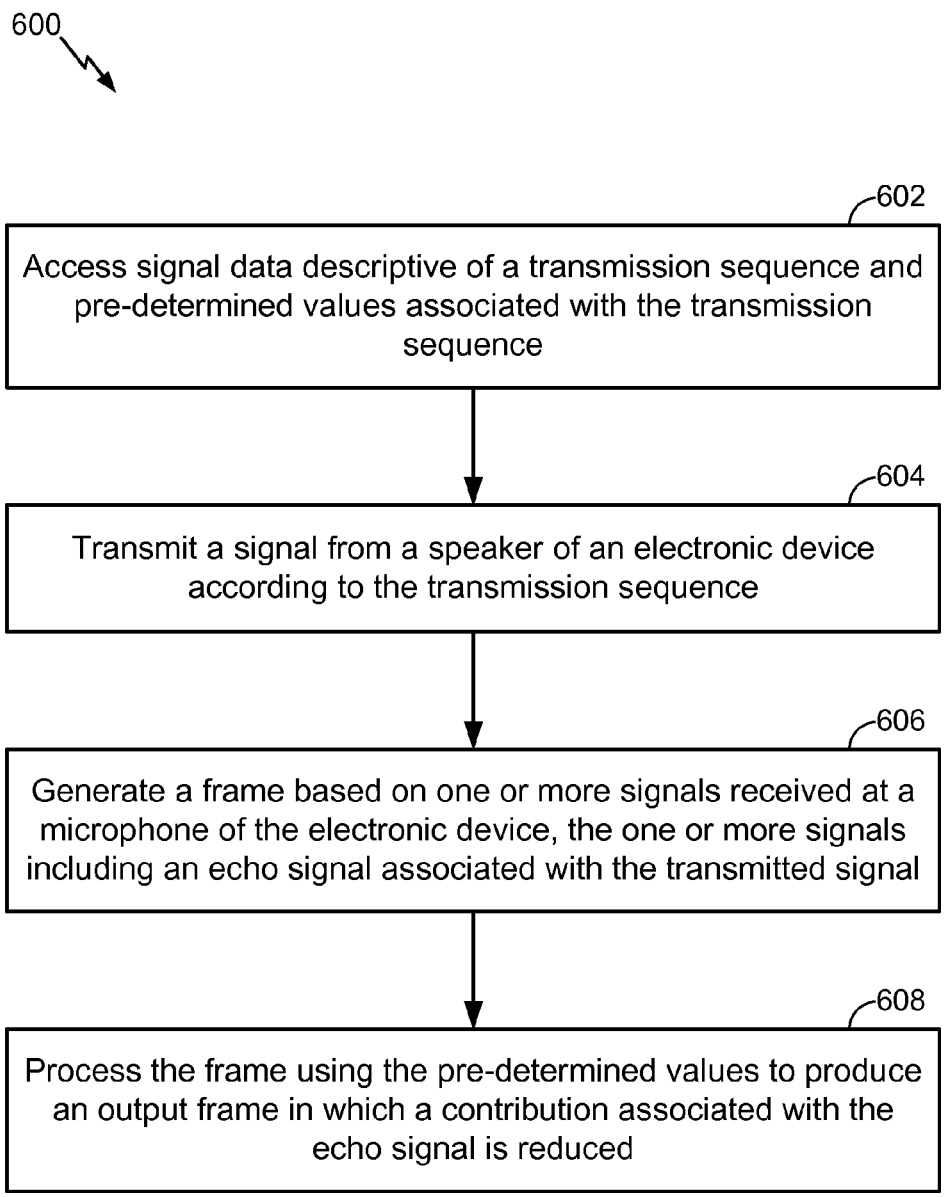
FIG. 6 is an illustrative embodiment of a method of performing echo cancellation using a pre-determined values associated with a transmission sequence.

Referring to FIG. 6, a first illustrative embodiment of a method 600 of performing echo cancellation is shown. At 602, the method 600 includes accessing signal data descriptive of a transmission sequence and pre-determined values associated with the transmission sequence. For example, the signal data and the pre-determined values may be stored at a memory, such as the memory 130 of FIG. 1 or the memory 206 of FIG. 2, before a signal corresponding to a particular transmission sequence is transmitted.

The method 600 includes, at 604, transmitting a signal from a transmitter of an electronic device according to the transmission sequence. At 606, the method 600 includes generating a frame based on one or more signals received at a microphone of the electronic device. The one or more signals may include an echo signal associated with the transmitted signal. At 608, the method 600 includes processing the frame using the pre-determined values to produce an output frame in which a contribution associated with the echo signal is reduced. In a particular embodiment, processing of the frame using the pre-determined values may be performed by the filter 140 of FIG. 1. In another particular embodiment, processing of the frame using the pre-determined values may be performed by the filter 208 of FIG. 2. In another particular embodiment, processing of the frame using the pre-determined values may be performed by the filter 332 of FIG. 3. In another particular embodiment, processing of the frame using the pre-determined values may be performed by the processor 402 using the echo cancellation instructions 422 of FIG. 4. In another particular embodiment, processing of the frame using the pre-determined values may be performed by the filter 510 of FIG. 5.

Figure 7:
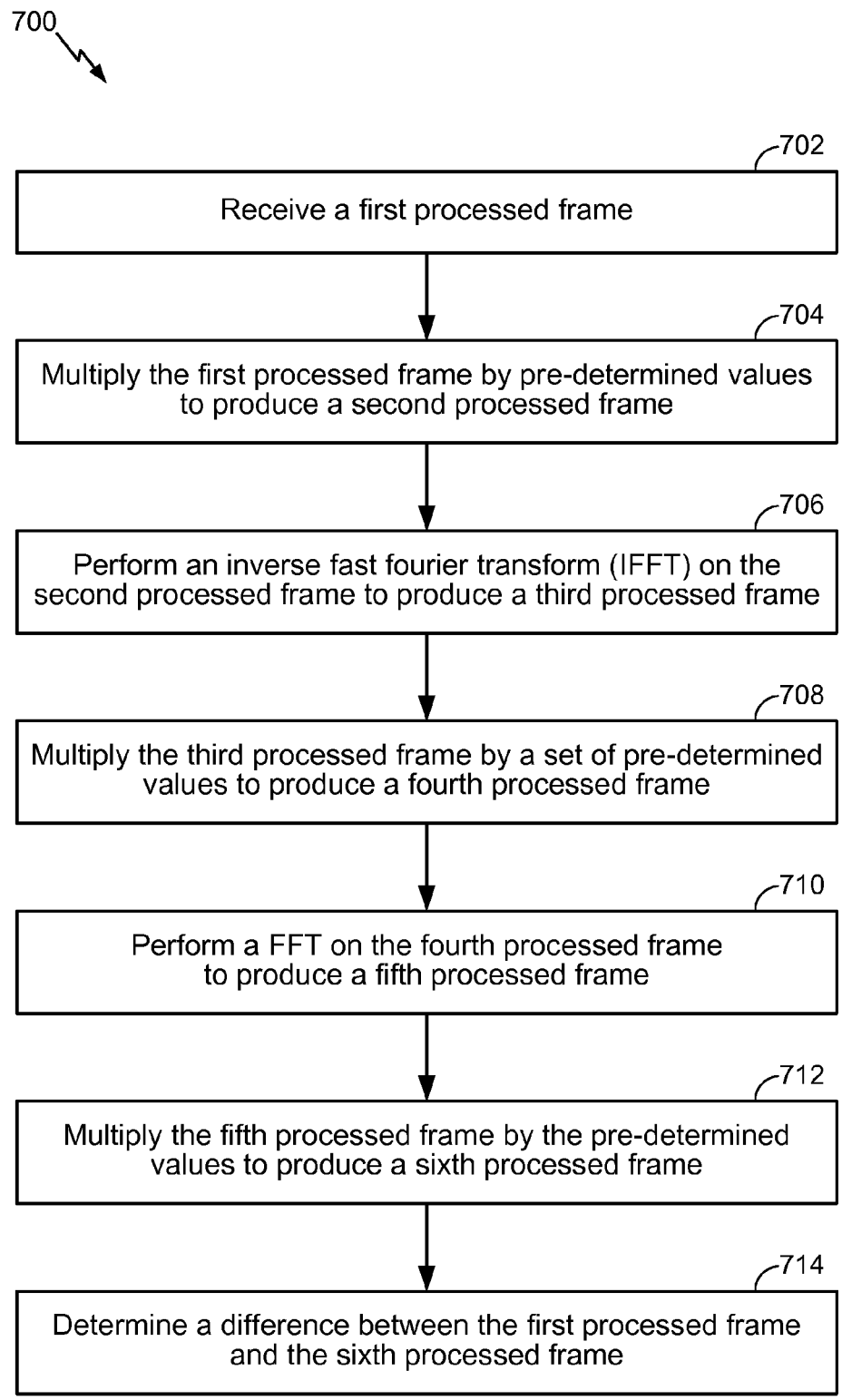
FIG. 7 is another illustrative embodiment of a method of performing echo cancellation using a pre-determined values associated with a transmission sequence.

Referring to FIG. 7, a second illustrative embodiment of a method 700 of performing echo cancellation is shown. At 702, the method 700 includes receiving a first processed frame. In an embodiment, the first processed frame may include, be included within, or correspond to the frame 220 of FIG. 2 which may be received at the filter 208 of FIG. 2. At 704, the method 700 includes multiplying the first processed frame by pre-determined values to produce a second processed frame (e.g., the frame 222 of FIG. 2). In a particular embodiment, the pre-determined values may be the pre-determined values 240 of FIG. 2.

At 706, the method 700 includes performing an inverse fast Fourier transform (IFFT) on the second processed frame to produce a third processed frame (e.g., the frame 224 of FIG. 2). At 708, the method 700 includes multiplying the third processed frame by a set of pre-determined values to produce a fourth processed frame (e.g., the frame 226 of FIG. 2). In a particular embodiment, the set of pre-determined values may include, be included within, or correspond to the set of pre-determined values 270. At 710, the method 700 includes performing an FFT on the fourth processed frame to produce a fifth processed frame (e.g., the frame 228 of FIG. 2). At 712, the method 700 includes multiplying the fifth processed frame by the pre-determined values to produce a sixth processed frame (e.g., the frame 230 of FIG. 2), and, at 714, determining a difference between the first processed frame and the sixth processed frame. In a particular embodiment, the difference between the first processed frame and the sixth processed frame produces an output frame (e.g., the frame 232 of FIG. 2) in which a contribution associated with an echo signal is reduced relative to an input frame (e.g., the input frame 218).

Figure 8:
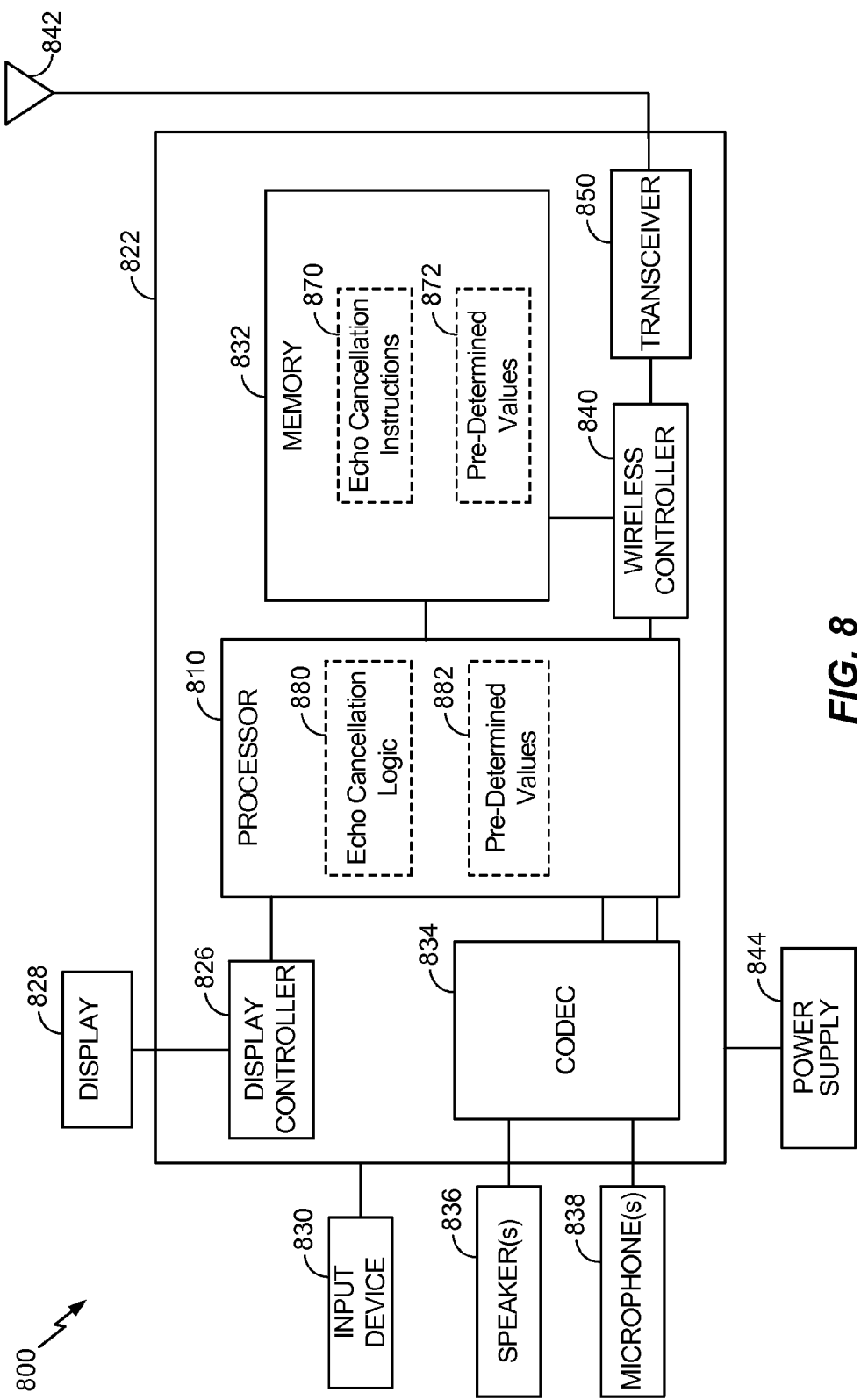
FIG. 8 is a block diagram of a particular illustrative embodiment of an electronic device operable to support the various methods, systems, and computer readable media disclosed with respect to FIGS. 1-6.

Referring to FIG. 8, a block diagram of a particular illustrative embodiment of an electronic device 800 operable to support the various methods, systems, and computer-readable media described with respect to FIGS. 1-7 is shown. The electronic device 800 includes a processor 810, such as a digital signal processor (DSP), coupled to a memory 832. In a particular embodiment, the electronic device 800 may correspond to the device 100 of FIG. 1 or the first electronic device 200 of FIG. 2, the device 302 of FIG. 3, the device 400 of FIG. 4, or the device 500 of FIG. 5.

As shown in FIG. 8, the electronic device 800 includes a display controller 826 that is coupled to the processor 810 and to a display 828. A coder/decoder (CODEC) 834 may also be coupled to the processor 810. A speaker(s) 836 and microphone(s) 838 may be coupled to the CODEC 834. In a particular embodiment, the microphone(s) 838 may be internal to the electronic device 800. In an embodiment, the microphone(s) 838 may correspond to the receiver(s) 120 of FIG. 1, the receiver(s) 204 of FIG. 2, the microphones 304, 306, 308 of FIG. 3, the receiver(s) 404 of FIG. 4, or the receiver(s) 504 of FIG. 5. In an embodiment, the speaker(s) 836 may correspond to the transmitter 110 of FIG. 1, the transmitter 202 of FIG. 2, the transmitter 310 of FIG. 3, the transmitter 406 of FIG. 4, or the transmitter 506 of FIG. 5.

As shown in FIG. 8, the electronic device 800 includes a wireless controller 840 that may be coupled to a transceiver 850 that is coupled to an antenna 842. In a particular embodiment, the processor 810, the display controller 826, the memory 832, the CODEC 834, the transceiver 850, and the wireless controller 840 are included in a system-in-package or a system-on-chip device 822. In a particular embodiment, an input device 830 and a power supply 844 are coupled to the system-on-chip device 822. In a particular embodiment, the display 828, the input device 830, the speaker(s) 836, the microphone 838, the wireless antenna 842, and the power supply 844 may be external to the system-on-chip device 822. However, each of the display 828, the input device 830, the speaker(s) 836, the microphone(s) 838, the wireless antenna 842, and the power supply 844 may be coupled to a component of the system-on-chip device 822, such as an interface or a controller.

The electronic device 800 may store pre-determined values, such as the pre-determined values 882, at the memory

832. In an embodiment, the pre-determined values may be stored at a memory (i.e., a cache memory) of the processor 810 as the pre-determined values 872. The processor 810 may include sequence selection logic (e.g., the sequence selector 512 of FIG. 5) configured to access the pre-determined values at the memory 832 or the pre-determined values 882. The electronic device 800 may receive signals (e.g., ultrasound signals) at the microphone(s) 838. The received signals may include an echo signal generated by the speaker(s) 836. In a particular embodiment, the CODEC 834 may process the received signals to generate an input frame (e.g., the input frame 170 of FIG. 1 or the input frame 218 of FIG. 2) and provide the input frame to the processor 810. In another embodiment, the input frame may be generated by the processor 810.

In a particular embodiment, the processor 810 may include echo cancellation logic 880 configured to process the input frame to produce an output frame (e.g., the output frame 164 of FIG. 1 or the output frame 232 of FIG. 2). A contribution of the echo signal to the output frame may be less than a contribution of the echo signal to the input frame. In an embodiment, the echo cancellation logic 880 may correspond to the filter 140 of FIG. 1 and may be configured to perform one or more of the operations described with reference to the processing blocks 150, 154, 158, 162 of FIG. 1. In another embodiment, the echo cancellation logic 880 may correspond to the filter 208 of FIG. 2 and may be configured to perform one or more of the operations described with reference to the processing blocks 250-262 of FIG. 2. In another embodiment, the echo cancellation logic 880 may correspond to the filter 332 of FIG. 3. In yet another embodiment, the echo cancellation logic 880 may correspond to the filter 510 described with reference to FIG. 5.

In another particular embodiment, the memory 832 may store echo cancellation instructions 870 that cause the processor 810 to perform echo cancellation operations on the input frame to produce the output frame as described with reference to FIGS. 1-7. A contribution of the echo signal to the output frame may be less than a contribution of the echo signal to the input frame. For example, the echo cancellation instructions 870 may correspond to the echo cancellation instructions 422 of FIG. 4. In another embodiment, the echo cancellation instructions 870 may be executable by the processor 810 to perform one or more of the operations described with reference to the processing blocks 150, 154, 158, 162 of FIG. 1 or the operations described with reference to the processing blocks 250-262 of FIG. 2.

The processor 810 may be configured to generate the pre-determined values (e.g., values that are determined before a transmission sequence related to the pre-determined values is sent, such as the pre-determined values 882 or the pre-determined values 872) based on signal data descriptive of a pre-determined transmission sequence. In a particular embodiment, the processor 810 may include a sequence selector (e.g., the sequence selector 512 of FIG. 5) configured to generate the pre-determined values and to store the pre-determined values at the memory (e.g., the memory 832 or a cache memory of the processor 810) or to access the pre-determined values at the memory 832. In another embodiment, the memory 832 may store sequence selection instructions (e.g., the sequence selection instructions 424 of FIG. 4) that cause the processor 810 to generate the pre-determined values and to store the pre-determined values at the memory (e.g., the memory 832 or a cache memory of the processor 810).

The processor 810 may be configured to determine a location of another electronic device (not shown) based on the output frame as described with reference to FIG. 3. For example, a particular portion of the received signals may correspond to a signal generated at the other electronic device. The processor 810 may use triangulation to determine a location (i.e., a direction and distance) of the other electronic device relative to the electronic device 800 based on the output frame. In a particular embodiment, the processor 810 may include location logic (e.g., the location determination unit 514 of FIG. 5) for use in determining the location of the other electronic device. In another embodiment, the memory 832 may store location instructions (e.g., the location instructions 426 of FIG. 4) that cause the processor 810 to determine the location of the other electronic device.

In conjunction with the described embodiments, a system is disclosed that may include means for transmitting a signal according to a transmission sequence. In a particular embodiment, the means for transmitting the signal may include the speaker(s) 836, the transmitter 110 of FIG. 1, the transmitter 202 of FIG. 2, the transmitter 310 of FIG. 3, the transmitter 406 of FIG. 4, or the transmitter 506 of FIG. 5. The system may include means for receiving one or more signals. In a particular embodiment, the means for receiving one or more signals may include the microphone(s) 838, the receiver(s) 120 of FIG. 1, the receiver(s) 204 of FIG. 2, the microphones 304-308 of FIG. 3, the receiver(s) 404 of FIG. 4, or the receiver(s) 504 of FIG. 5. The system may include means for storing pre-determined values associated with a transmission sequence. In an embodiment, the means for storing the pre-determined values associated with the transmission sequence may include the memory 832, the memory 130 of FIG. 1, the memory 206 of FIG. 2, the memory 330 of FIG. 3, the memory 408 of FIG. 4, or the memory 508 of FIG. 5. In another embodiment, the means for storing the pre-determined values associated with the transmission sequence may include a memory (e.g., a cache memory) or register of the processor 810.

The system may include means for generating an input (e.g., the input frame 170 of FIG. 1 or the input frame 218 of FIG. 2) based on the one or more received signals. In an embodiment, the means for generating the input based on the one or more received signals may include the processor 810. In another embodiment, the means for generating the input based on the one or more received signals may include the receiver(s) 120 of FIG. 1 or the receiver(s) 204 of FIG. 2. In another embodiment, the means for generating the input based on the one or more received signals may include the filter 510 of FIG. 5. In an embodiment, the means for generating an input based on the one or more received signals may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof configured to generate an input based on one or more received signals.

The system may include means for processing the input based on the pre-determined values to produce a first output (e.g., the frame 160 of FIG. 1 or the frame 230 of FIG. 2). The first output may be indicative of a contribution of the transmitted signal to the input. In an embodiment, the means for processing the input based on the pre-determined values may include the echo cancellation logic 880, which may be incorporated within the processor 810. In another embodiment, the echo cancellation logic 880 may be external to the processor 810 and may be implemented by a FPGA device, an ASIC, a processing unit such as a CPU, a DSP, a controller, another hardware device, firmware device, or any combination thereof. In an embodiment, the means for processing the input based on the pre-determined values may include the first processing path 142 of FIG. 1 (e.g., the processing blocks 150, 154, 158, 162 of FIG. 1) of the filter 140 of FIG. 1. In another embodiment, the means for processing the input based on the pre-determined values may include the first processing path 210 of FIG. 2 (e.g., the processing blocks 250-262 of FIG. 2) of the filter 208 of FIG. 2. In another embodiment, the means for processing the input based on the pre-determined values may include the filter 332 of FIG. 3. In an embodiment, the first processing path 142, the first processing path 210 may be implemented by a FPGA device, an ASIC, a processing unit such as a CPU, a DSP, a controller, another hardware device, a firmware device, or any combination thereof configured to perform the functions described with reference to the processing blocks 150, 154, 158 of FIG. 1 or the processing blocks 252-260 of FIG. 2.

The system may include means for generating a second output (e.g., the output frame 164 of FIG. 1 or the output frame 232 of FIG. 2) based on a difference between the input and the first output. In an embodiment, the means for generating the second output may include the echo cancellation logic 880. In a particular embodiment, the echo cancellation logic 880 may be incorporated within the processor 810. In another embodiment, the echo cancellation logic 880 may be external to the processor 810 (e.g., as application specific circuitry). In an embodiment, the means for generating the second output may include the second processing path 144 (e.g., the processing block 162 of FIG. 1) of the filter 140 of FIG. 1, the second processing path 212 (e.g., the processing block 262 of FIG. 2) of the filter 208 of FIG. 2, or may include the filter 332 of FIG. 3. In an embodiment, the second processing path 144 of the filter 140 of FIG. 1 or the second processing path 212 of the filter 208 of FIG. 2 may be implemented by a FPGA device, an ASIC, a processing unit such as a CPU, a DSP, a controller, another hardware device, firmware device, or any combination thereof configured to perform the functions described with reference to the processing block 162 of FIG. 1 or the processing block 262 of FIG. 2.

In an embodiment, the means for generating the input (e.g., the frame 220 of FIG. 2) may include means for receiving a frame (e.g., the frame 218 of FIG. 2) generated based on the one or more received signals and means for performing a fast Fourier transform (FFT) on the frame. The input may include a result of the FFT. In an embodiment, the means for performing the FFT on the frame may include the first processing block 250 of FIG. 2. In an embodiment, the first processing block 250 may be implemented by a FPGA device, an ASIC, a processing unit such as a CPU, a DSP, a controller, another hardware device, a firmware device, or any combination thereof configured to receive a frame and perform a FFT on the frame.

In a particular embodiment, the means for processing the input (e.g., the frame 220 of FIG. 2) includes means for determining a first product (e.g., the frame 222 of FIG. 2) by multiplying the input by the pre-determined values, means for performing an inverse fast Fourier transform (IFFT) on the first product, means for determining a second product (e.g., the frame 226) by multiplying a result of the IFFT (e.g., the frame 224 of FIG. 2) by a set of pre-determined values (e.g., the set of pre-determined values 270 of FIG. 2), means for performing a second FFT on the second product, and means for multiplying a result of the second FFT (e.g., the frame 228 of FIG. 2) by the pre-determined values to produce the first output (e.g., the frame 230).

In an embodiment, the means for determining the first product, the means for performing the IFFT on the first product, the means for determining the second product, the means for performing the second FFT on the second product, and the means for multiplying a result of the second FFT may each be implemented by a FPGA device, an ASIC, a processing unit such as a CPU, a DSP, a controller, another hardware device, firmware device, or any combination thereof configured to perform the functions described with reference to the second processing block 154 of FIG. 1. In an embodiment, the means for performing the IFFT on the first product corresponds to the third processing block 254. In an embodiment, the set of pre-determined values corresponds to the set of pre-determined values 132 described with reference to FIG. 1.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

The invention claimed is:

1. A method comprising:
    accessing signal data descriptive of a transmission sequence and pre-determined values associated with the transmission sequence, wherein the signal data and the pre-determined values are stored in a memory;
    transmitting a first signal from a speaker of a first electronic device according to the transmission sequence;

generating a frame based on one or more signals received at a microphone of the first electronic device, the one or more signals including an echo signal associated with the first signal;

processing the frame using the pre-determined values to produce an output frame in which a contribution associated with the echo signal is reduced; and determining a position of a second electronic device based on the output frame.

2. The method of claim 1, wherein the pre-determined values correspond to a fast Fourier transform (FFT) of the transmission sequence.

3. The method of claim 2, wherein processing the frame further comprises:

performing an FFT on the frame to produce a first processed frame; and providing the first processed frame to echo cancellation logic, wherein the echo cancellation logic is configured to process the first processed frame based on the pre-determined values.

4. The method of claim 3, wherein processing the first processed frame based on the pre-determined values comprises:

multiplying the first processed frame by the pre-determined values to produce a second processed frame;

performing an inverse fast Fourier transform (IFFT) on the second processed frame to produce a third processed frame;

multiplying the third processed frame by a set of pre-determined values to produce a fourth processed frame;

performing a FFT on the fourth processed frame to produce a fifth processed frame;

multiplying the fifth processed frame by the pre-determined values to produce a sixth processed frame; and determining a difference between the first processed frame and the sixth processed frame.

5. The method of claim 4, wherein the output frame is generated based on the difference between the first processed frame and the sixth processed frame.

6. The method of claim 1, wherein the transmission sequence is locally unique to the first electronic device.

7. The method of claim 6, wherein the first electronic device is a mobile communication device.

8. The method of claim 1, wherein the one or more received signals includes a second signal transmitted by the second electronic device, and wherein the second electronic device transmits the second signal according to a second transmission sequence that is different from the transmission sequence.

9. The method of claim 8, wherein the one or more received signals comprise ultrasound signals.

10. The method of claim 1, wherein the first signal comprises an ultrasound signal and wherein the transmission sequence is a periodic sequence.

11. An apparatus comprising:

a first transmitter configured to transmit a first signal according to a transmission sequence;

a receiver configured to receive one or more signals;

a memory storing pre-determined values associated with the transmission sequence;

a filter including a first processing path and a second processing path, the filter configured to:

receive an input at the first processing path, wherein the input is generated based on the one or more received signals;

retrieve the pre-determined values from the memory; and process the input based on the pre-determined values to produce an output of the first processing path, the output of the first processing path indicative of a contribution of the first signal to the input;

receive the output of the first processing path at the second processing path; and generate an output frame based on a difference between the input at the first processing path and the output of the first processing path; and logic configured to determine a location of a second transmitter based on the output frame.

12. The apparatus of claim 11, wherein the filter further comprises frame logic coupled to the first processing path and the second processing path, the frame logic configured to:

receive a frame generated based on the one or more received signals;

perform a fast Fourier transform (FFT) on the frame to produce a first processed frame; and provide the first processed frame to the first processing path and to the second processing path, wherein the input is the first processed frame.

13. The apparatus of claim 12, wherein the filter is further configured to:

multiply the first processed frame by the pre-determined values to produce a second processed frame;

perform an inverse fast Fourier transform (IFFT) on the second processed frame to produce a third processed frame;

multiply the third processed frame by a set of pre-determined values to produce a fourth processed frame;

perform a second FFT on the fourth processed frame to produce a fifth processed frame;

multiply the fifth processed frame by the pre-determined values to produce the output; and provide the output to the second processing path.

14. The apparatus of claim 13, wherein the pre-determined values correspond to an FFT of the transmission sequence.

15. The apparatus of claim 13, wherein the set of pre-determined values comprises a Toeplitz matrix.

16. The apparatus of claim 11, wherein the one or more received signals include a second signal generated by the second transmitter according to a second transmission sequence that is different than the transmission sequence.

17. The apparatus of claim 16, wherein the input includes first information associated with the first signal and second information associated with the second signal, and wherein a contribution of the first signal to a second output from the second processing path is less than the contribution of the first signal to the input.

18. The apparatus of claim 17, wherein the first transmitter is incorporated into a first device, and wherein the second transmitter is incorporated into a second device that is different than the first device.

19. The apparatus of claim 11, wherein the first signal comprises an ultrasound signal.

20. The apparatus of claim 19, wherein the ultrasound signal comprises a periodic signal.

21. The apparatus of claim 11, further comprising sequence selection logic configured to:

select a second transmission sequence;

generate second pre-determined values associated with the second transmission sequence; and store the second pre-determined values at the memory.

22. The apparatus of claim 21, wherein, subsequent to selecting the second transmission sequence, the first transmitter is configured to transmit a second signal according to the second transmission sequence.

23. The apparatus of claim 21, wherein the selection logic selects the second transmission sequence from a plurality of pre-determined transmission sequences.

24. The apparatus of claim 23, wherein the plurality of pre-determined transmission sequences comprises gold code sequences.

25. A non-transitory computer-readable storage medium comprising instructions that, when executed by a processor, cause the processor to:
   access signal data descriptive of a transmission sequence and pre-determined values associated with the transmission sequence, wherein the signal data and the pre-determined values are stored in a memory;
   cause a speaker of a first electronic device to transmit a signal according to the transmission sequence;
   generate a frame based on one or more signals received at a microphone of the electronic device, the one or more signals including an echo signal associated with the transmitted signal;
   process the frame using the pre-determined values to produce an output frame in which a contribution associated with the echo signal is reduced; and
   determine a location of a second electronic device based on the output frame.

26. The non-transitory computer-readable storage medium of claim 25, further comprising instructions that, when executed by the processor, cause the processor to perform a fast Fourier transform (FFT) on the transmission sequence to produce the pre-determined values before the signal is transmitted.

27. The non-transitory computer-readable storage medium of claim 26, further comprising instructions that, when executed by the processor, cause the processor to:
   perform an FFT on the frame to produce a first processed frame; and
   provide the first processed frame to echo cancellation logic configured to process the first processed frame based on the pre-determined values.

28. The non-transitory computer-readable storage medium of claim 27, further comprising instructions that, when executed by the processor, cause the processor to:
   multiply the first processed frame by the pre-determined values to produce a second processed frame;
   perform an inverse fast Fourier transform (IFFT) on the second processed frame to produce a third processed frame;
   multiply the third processed frame by a set of pre-determined values to produce a fourth processed frame;
   perform a second FFT on the fourth processed frame to produce a fifth processed frame;
   multiply the fifth processed frame by the pre-determined values to produce a sixth processed frame; and
   determine a difference between the first processed frame and the sixth processed frame.

29. The non-transitory computer-readable storage medium of claim 28, wherein the output frame is generated based on the difference between the first processed frame and the sixth processed frame.

30. The non-transitory computer-readable storage medium of claim 25, wherein the transmission sequence is locally unique to the first electronic device.

31. The non-transitory computer-readable storage medium of claim 30, wherein the first electronic device is a mobile communication device.

32. An apparatus comprising:
   means for transmitting a signal from a first electronic device according to a transmission sequence;
   means for receiving one or more signals including an echo signal associated with the transmitted signal;
   means for storing pre-determined values associated with the transmission sequence;
   means for generating an input based on the one or more received signals;
   means for processing the input based on the pre-determined values to produce a first output, wherein the first output is indicative of a contribution of the transmitted signal to the input;
   means for generating a second output based on a difference between the input and the first output; and
   means for determining a location of a second electronic device based on the second output.

33. The apparatus of claim 32, wherein the means for generating the input comprises:
   means for receiving a frame generated based on the one or more received signals; and
   means for performing a fast Fourier transform (FFT) on the frame, wherein the input is a result of the FFT.

34. The apparatus of claim 32, wherein the pre-determined values correspond to a fast Fourier transform (FFT) of the transmission sequence.

35. The apparatus of claim 34, wherein the means for processing the input comprises:
   means for determining a first product by multiplying the input by the pre-determined values;
   means for performing an inverse fast Fourier transform (IFFT) on the first product;
   means for determining a second product by multiplying a result of the IFFT by a set of pre-determined values;
   means for performing a second FFT on the second product; and
   means for multiplying a result of the second FFT by the pre-determined values to produce the first output.

36. The apparatus of claim 35, where the set of pre-determined values corresponds to a Toeplitz matrix.

* * * * *